United States Patent
Zhu et al.

(10) Patent No.: US 10,821,683 B2
(45) Date of Patent: Nov. 3, 2020

(54) METHOD FOR MOLDING FLAME-RETARDANT BENDING BEAM INTEGRATED WITH THREE-DIMENSIONAL NYLON AIR DUCT AND PRODUCTION MOULD THEREOF

(71) Applicant: SHANGHAI CEDAR COMPOSITES TECHNOLOGY CO., LTD., Shanghai (CN)

(72) Inventors: Jiaqiang Zhu, Shanghai (CN); Bin Wang, Shanghai (CN); Hui Tang, Shanghai (CN); Ming Wang, Shanghai (CN); Changzhi Xie, Shanghai (CN); Jianlan Luo, Shanghai (CN); Yongkai Liu, Shanghai (CN)

(73) Assignee: SHANGHAI CEDAR COMPOSITES TECHNOLOGY CO., LTD., Shanghai (CN)

( * ) Notice: Subject to any disclaimer, the term of this patent is extended or adjusted under 35 U.S.C. 154(b) by 152 days.

(21) Appl. No.: 16/063,251

(22) PCT Filed: Aug. 23, 2016

(86) PCT No.: PCT/CN2016/096335
§ 371 (c)(1),
(2) Date: Jun. 16, 2018

(87) PCT Pub. No.: WO2017/101491
PCT Pub. Date: Jun. 22, 2017

(65) Prior Publication Data
US 2018/0370161 A1  Dec. 27, 2018

(30) Foreign Application Priority Data

Dec. 16, 2015  (CN) .......................... 2015 1 0947278

(51) Int. Cl.
*B29C 70/46* (2006.01)
*B29C 70/54* (2006.01)
(Continued)

(52) U.S. Cl.
CPC ............ *B29C 70/462* (2013.01); *B29C 70/54* (2013.01); *B29C 70/542* (2013.01); *B29C 70/48* (2013.01);
(Continued)

(58) Field of Classification Search
None
See application file for complete search history.

(56) References Cited

U.S. PATENT DOCUMENTS

2005/0044712 A1* 3/2005 Gideon ............... B60R 13/0815
29/897.32
2011/0027526 A1* 2/2011 McCarville ........... B29C 70/865
428/116

* cited by examiner

*Primary Examiner* — Barbara J Musser (57) ABSTRACT

A method for molding a flame-retardant bending beam integrated with a three-dimensional (3D) nylon air duct and a production mould thereof are provided. The method includes steps of: (1), producing the 3D nylon air duct; (2), selecting a flame-retardant carbon fiber pre-impregnated material: (3), laminating the pre-impregnated material and pre-molding; and (4), curing and molding composite material. The production mould includes an upper mould, a lower mould, sliding blocks and an air nozzle port. Compared with a traditional bending beam of metal molding, the flame-retardant bending beam integrated with the 3D nylon air duct achieves a same flame-retardant effect, and meanwhile has simple operation, flexible product shape, higher strength, lighter weight and corrosion resistance.

3 Claims, 8 Drawing Sheets

(51) Int. Cl.
 _B29L 23/00_ (2006.01)
 _B29C 70/48_ (2006.01)
 _B29K 307/04_ (2006.01)
(52) U.S. Cl.
 CPC ....... *B29K 2307/04* (2013.01); *B29L 2023/22* (2013.01)

METHOD FOR MOLDING FLAME-RETARDANT BENDING BEAM INTEGRATED WITH THREE-DIMENSIONAL NYLON AIR DUCT AND PRODUCTION MOULD THEREOF

CROSS REFERENCE OF RELATED APPLICATION

This is a U.S. National Stage under 35 U.S.C 371 of the International Application PCT/CN2016/096335, filed Aug. 23, 2016, which claims priority under 35 U.S.C. 119(a-d) to CN 201510947278.4, filed Dec. 16, 2015.

BACKGROUND OF THE PRESENT INVENTION

Field of Invention

The present invention relates to a molding technique and a production mould, and more particularly to a method for molding a flame-retardant bending beam integrated with a three-dimensional nylon air duct and a production mould thereof.

Description of Related Arts

Compared with the traditional metal materials, the carbon fiber composite material has many excellent performances, such as light weight, high specific strength, good dimensional stability and excellent chemical stability. Thus, the carbon fiber composite material can be used in more and more fields, and the production process thereof also tends to be mature. According to the different applications and structures of the product, many different molding techniques of the carbon fiber composite material emerge widely. Compared with the traditional metal high-speed rail bending beam, the flame-retardant high-strength high-speed rail bending beam integrated with the three-dimensional nylon air duct does not require complex processes such as opening, bending and welding. Moreover, the product shape after the molding process is guaranteed with a unified standard (mould guarantee), which solves the problem that the shape of the conventional product obtained through the manual molding processes of opening, bending and welding is non-uniform.

The present invention is mainly to provide a product which has a simple structure, a unique shape, a reduced weight and enhanced mechanical properties.

SUMMARY OF THE PRESENT INVENTION

In view of above problems, an object of the present invention is to provide a molding technique and a production mould, and more particularly to provide a method for molding a flame-retardant bending beam integrated with a three-dimensional (3D) nylon air duct and a production mould thereof.

The present invention adopts following technical solutions to solve the above technical problems.

A method for molding a flame-retardant bending beam integrated with a 3D nylon air duct comprises steps of:

(1), producing the 3D nylon air duct, particularly comprising steps of: cutting a nylon air duct with a width of 300-500 mm into a prototype air duct corresponding to a shape and a size of an inner cavity of the bending beam; sealing up periphery of the prototype air duct through a sealing machine with an air nozzle exposed outside, so that the 3D nylon air duct is formed;

(2), selecting a flame-retardant carbon fiber pre-impregnated material, wherein a material obtained through pre-impregnating epoxy flame-retardant resin and carbon fiber precursors is called the flame-retardant carbon fiber pre-impregnated material;

(3), laminating the pre-impregnated material and pre-molding, particularly comprising steps of: according to a designed lamination structural sequence, successively pasting the carbon fiber pre-impregnated material with a tailored size into a cavity and on sliding blocks of a mould, wherein the pre-impregnated material is required to be compacted by a plastic scraper during lamination;

placing the 3D nylon air duct at a hollow space in the middle of the bending beam; pumping a safety pressure of 0.1 MPa to the 3D nylon air duct, and checking whether the air duct ventilates normally; and (4), curing and molding composite material, particularly comprising steps of: after closing the mould of a product in step (3), placing the mould on a hot press machine; and processing the product with thermal molding, with temperature and pressure parameters set according to a molding control standard of the bending beam; wherein: detailed parameters are described as follows:

a molding time is 3600 s with a pressure kept at 1.2 MPa;
a molding temperature is 145±5° C.;
an external pressure of the hot press machine is 4 MPa;
a pressurizing formula of the 3D nylon air duct is that: the pressure is slowly increased to 0.2 MPa during 0-50 s, then slowly increased to 0.6 MPa during 50-300 s, thereafter slowly increased to 1.0 MPa during 300-600 s, and finally slowly increased to 1.2 MPa during 600-3600 s.

Preferably, according to different shapes and sizes of the product, a thickness of the 3D nylon air duct can be 20 μm, 40 μm and 60 μm.

Preferably, the pre-impregnated material is required to be compacted by the plastic scraper during lamination; and the plastic scraper is made of at least one member selected from a group consisting of PVC (polyvinyl chloride), PET (polyethylene terephthalate), PTFE (polytetrafluoroethylene) and rubber.

A production mould of the flame-retardant bending beam integrated with the 3D nylon air duct comprises an upper mould, a lower mould, sliding blocks and an air nozzle port, wherein: the air nozzle port is located on the lower mould; the number of the sliding blocks is two; the air nozzle of the 3D nylon air duct is placed at the air nozzle port; the lower mould serves as a product placement basis; the two sliding blocks are respectively arranged at a left side and a right side of the lower mould; the upper mould covers the lower mould and the two sliding blocks for fixing the production mould and for molding of the flame-retardant bending beam.

Preferably, the upper mould comprises an upper mould body with an arc-shaped space, wherein: arc-shaped grooves are opened on the upper mould body; two cutting boards are respectively arranged at a left side and a right side of the arc-shaped space; two dam boards are respectively arranged at an upper side and a lower side of the arc-shaped space; a step is arranged on one of the dam boards; upper mould grooves corresponding to the lower mould are opened on the step and the other dam board; the flame-retardant bending beam required to be produced is arranged among the cutting boards and the dam boards; and the whole upper mould is integrally formed.

Preferably, a length of the arc-shaped grooves is in a range of 380-440 mm; a width of the arc-shaped grooves is in a range of 2-4 mm.

Preferably, the lower mould serves as the product placement basis, comprising a lower mould base, two steps respectively arranged at an upper side and a lower side of the lower mould base, and a convex part between the two steps, wherein: the air nozzle port is opened at one of the two steps; grooves corresponding to convex strips of the sliding blocks are opened on the lower mould; the whole lower mould is integrally formed; an edge is arranged at a joint between the step where the air nozzle port is opened and the lower mould base.

Preferably, structures of the two sliding blocks are completely symmetrical; each sliding block comprises a convex surface and a convex part; a screw hole is opened at a side surface of each sliding block; and a screw passes through the screw hole for fastening the sliding block at the lower mould.

Preferably, the nylon air duct is made into a 3D shape same as an interior shape of the high-speed rail bending beam. During compression molding of the carbon fiber composite material, the 3D nylon air duct as an inner tank is placed in the mould cavity laminated with the carbon fiber composite material; when thermal molding, the product interior is pressurized through the air nozzle, so that the high-speed rail bending beam of carbon fiber composite material is integrally formed and cured.

The present invention has following positive effects. The flame-retardant high-strength high-speed rail bending beam integrated with the 3D nylon air duct is provided by the present invention; the thermal molding process mainly utilizes the 3D nylon air duct with the carbon fiber pre-impregnated material for compression molding; the production of the 3D nylon air duct is involved, which is mainly for assisting molding of the composite material product having the complex curved-surface structure. Compared with the traditional bending beam of metal molding, the flame-retardant high-strength high-speed rail bending beam integrated with the 3D nylon air duct achieves the same flame-retardant effect, and meanwhile has the simple operation, flexible product shape, higher strength, lighter weight and corrosion resistance.

DETAILED DESCRIPTION OF THE PREFERRED EMBODIMENT

A preferred embodiment of the present invention is illustrated with accompanying drawings, so as to describe technical solutions of the present invention in detail.

Figure 5:
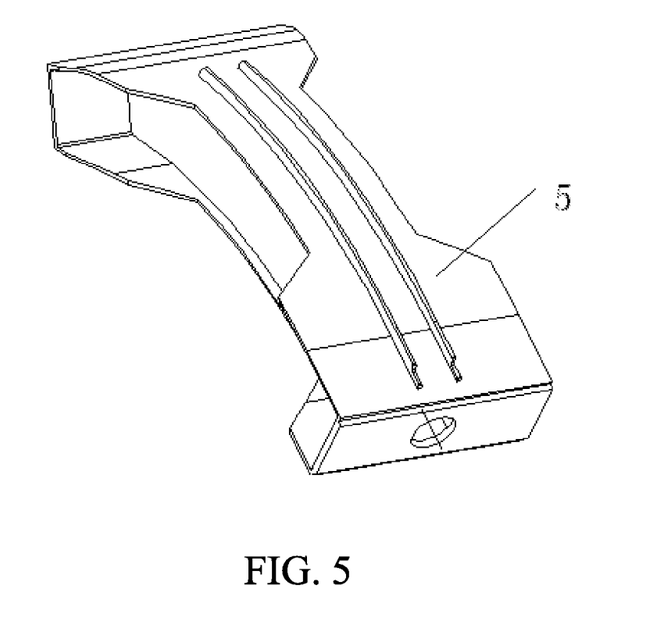
FIG. 5 is a structural sketch view of the flame-retardant bending beam made through the production mould according to the preferred embodiment of the present invention.

A method for molding a flame-retardant bending beam integrated with a three-dimensional (3D) nylon air duct comprises steps of:

(1), producing the 3D nylon air duct, particularly comprising steps of: cutting a nylon air duct with a width of 300-500 mm into a prototype air duct corresponding to a shape and a size of an inner cavity of the bending beam; sealing up periphery of the prototype air duct through a sealing machine with an air nozzle exposed outside, so that the 3D nylon air duct is formed;

(2), selecting a flame-retardant carbon fiber pre-impregnated material, wherein a material obtained through pre-impregnating epoxy flame-retardant resin and carbon fiber precursors is called the flame-retardant carbon fiber pre-impregnated material;

(3), laminating the pre-impregnated material and pre-molding, particularly comprising steps of: according to a designed lamination structural sequence, successively pasting the carbon fiber pre-impregnated material with a tailored size into a cavity and on sliding blocks of a mould, wherein the pre-impregnated material is required to be compacted by a plastic scraper during lamination;

placing the 3D nylon air duct at a hollow space in the middle of the bending beam; pumping a small amount of pressure to the 3D nylon air duct, and checking whether the air duct ventilates normally; and (4), curing and molding composite material, particularly comprising steps of: after pasting the pre-impregnated material to the mould, ensuring no abnormality exists; closing the mould (ensuring that no pre-impregnated material is clamped), and placing the mould on a hot press machine; processing the product with thermal molding, with temperature and pressure parameters set according to a molding control standard of the bending beam; after reaching a molding time, taking the mould out of the hot press machine, and placing into a cooling stage for cooling the mould; after the mould gets cooled, opening the mould, and taking the product out; and obtaining the high-strength flame-retardant bending beam 5 shown in FIG. 5.

Detailed parameters are described as follows:
the molding time is 3600 s with a pressure kept at 1.2 MPa;
a molding temperature is 145±5° C.;
an external pressure of the hot press machine is 4 MPa;
a pressurizing formula of the 3D nylon air duct is that: the pressure is slowly increased to 0.2 MPa during 0-50 s, then slowly increased to 0.6 MPa during 50-300 s, thereafter slowly increased to 1.0 MPa during 300-600 s, and finally slowly increased to 1.2 MPa during 600-3600 s.

The material used by the product is the carbon fiber composite material which has the high strength and the high modulus, and meanwhile is able to achieve the flame-retardant effect. Moreover, compared with the metal bending beam, the weight of the carbon fiber bending beam is directly decreased by 40%.

According to different shapes and sizes of the product, a thickness of the 3D nylon air duct can be 20 μm, 40 μm and 60 μm.

The pre-impregnated material is required to be compacted by the plastic scraper during lamination; and the plastic scraper is made of at least one member selected from a group consisting of PVC (polyvinyl chloride), PET (polyethylene terephthalate), PTFE (polytetrafluoroethylene) and rubber.

Figure 1:
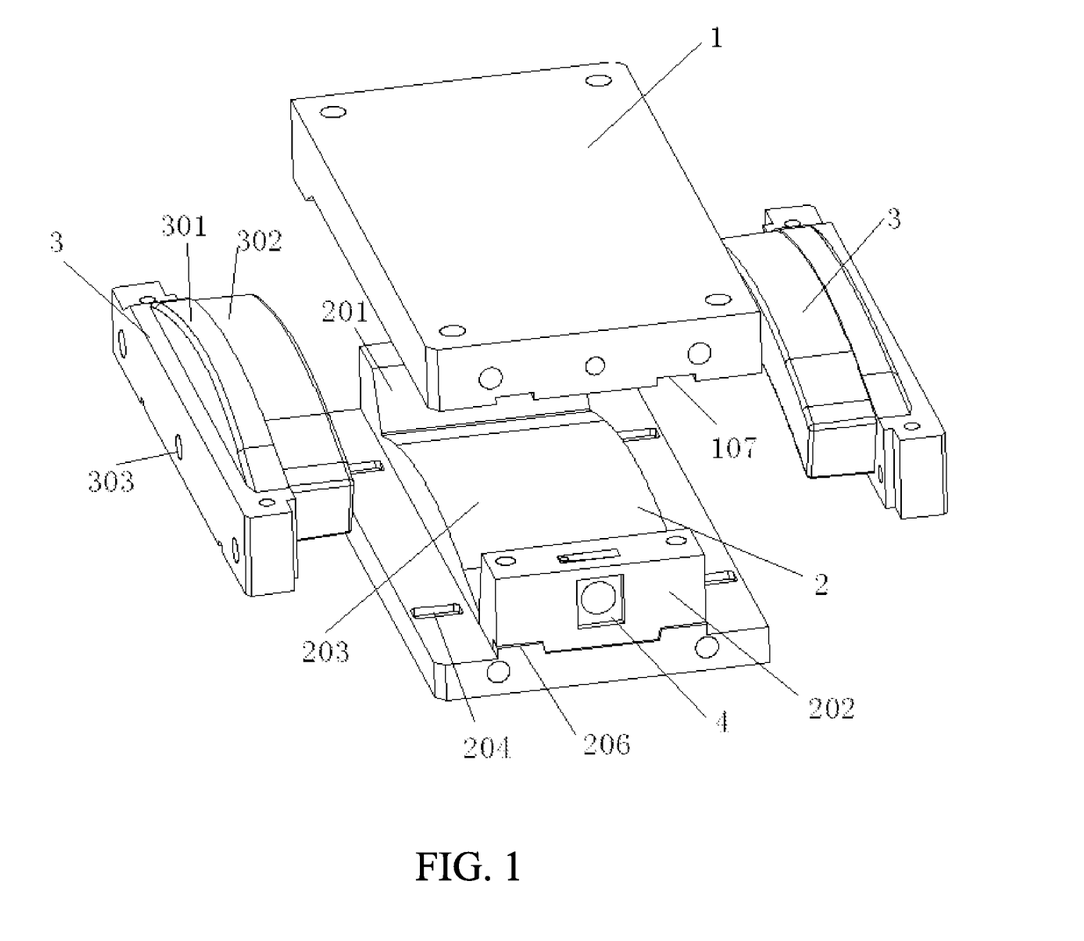
FIG. 1 is a structural sketch view of a production mould of a flame-retardant bending beam integrated with a three-dimensional (3D) nylon air duct according to a preferred embodiment of the present invention.

FIG. 1 is a structural sketch view of the production mould of the flame-retardant bending beam integrated with the 3D nylon air duct. As shown in FIG. 1, the production mould comprises an upper mould 1, a lower mould 2, sliding blocks 3 and an air nozzle port 4, wherein: the air nozzle port 4 is located on the lower mould 2; the number of the sliding blocks 3 is two; the air nozzle of the 3D nylon air duct is placed at the air nozzle port 4; the lower mould 2 serves as a product placement basis; the two sliding blocks 3 are respectively arranged at a left side and a right side of the lower mould 2; the upper mould 1 covers the lower mould 2 and the two sliding blocks 3 for fixing the production mould and for molding of the flame-retardant bending beam.

Figure 2A:
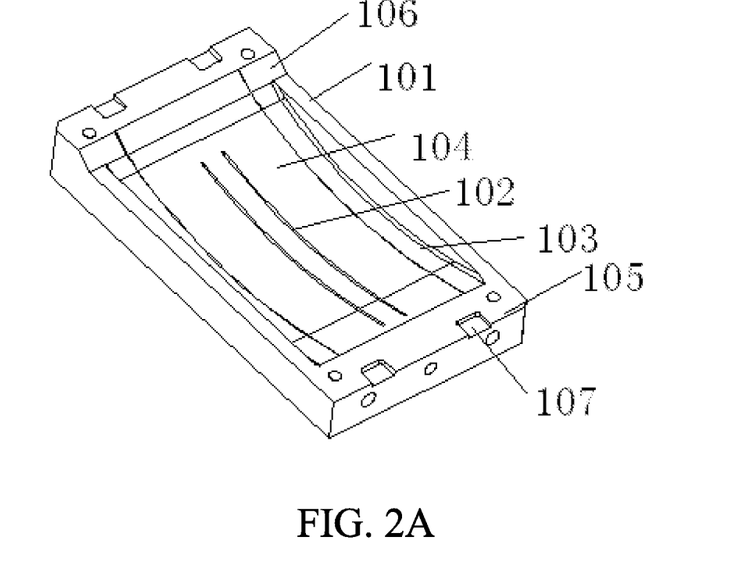
FIG. 2A is a perspective view of an upper mould according to the preferred embodiment of the present invention.
Figure 2B:
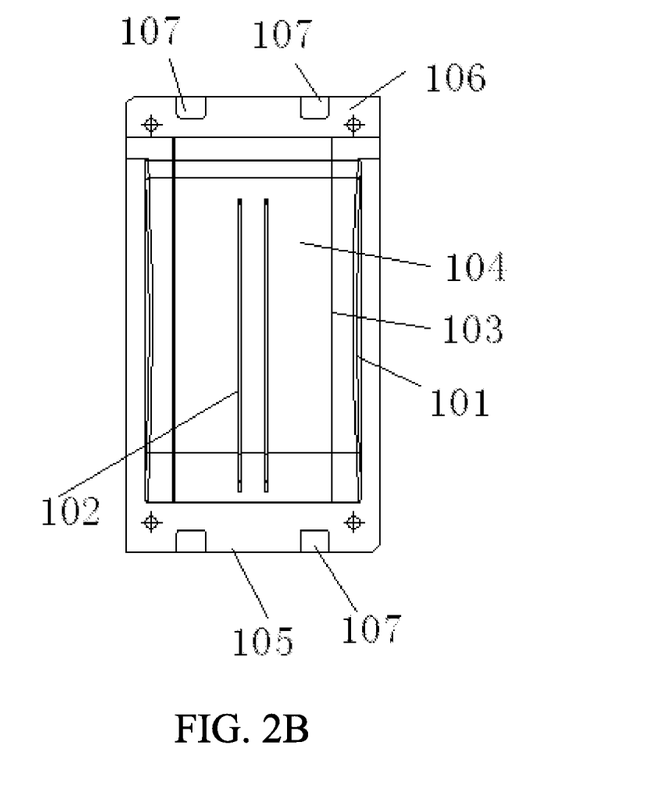
FIG. 2B is a main view of the upper mould according to the preferred embodiment of the present invention.
Figure 2C:
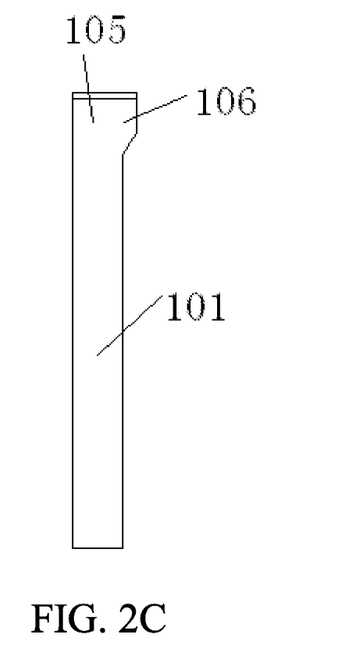
FIG. 2C is a left view of the upper mould according to the preferred embodiment of the present invention.
Figure 2D:
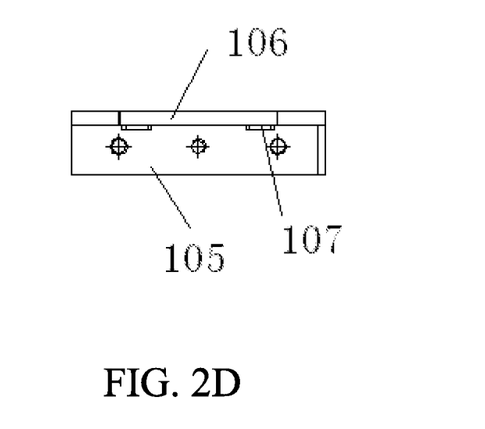
FIG. 2D is a bottom view of the upper mould according to the preferred embodiment of the present invention.

FIG. 2A is a perspective view of the upper mould. FIG. 2B is a main view of the upper mould. FIG. 2C is a left view of the upper mould. FIG. 2D is a bottom view of the upper mould. As shown in FIG. 2A-FIG. 2D, the upper mould 1 of the production mould is for guaranteeing the shape and the appearance of an upper surface of the flame-retardant bending beam; two grooves are opened at the upper mould 1 to serve as reinforcing ribs of the product. The upper mould 1 comprises an upper mould body 101 with an arc-shaped space 104, wherein: arc-shaped grooves 102 are opened on the upper mould body 101; two cutting boards 103 are respectively arranged at a left side and a right side of the arc-shaped space 104; two dam boards 105 are respectively arranged at an upper side and a lower side of the arc-shaped space 104; a step 106 is arranged on one of the dam boards 105; upper mould grooves 107 corresponding to the lower mould 2 are opened on the step 106 and the other dam board 105; the flame-retardant bending beam required to be produced is arranged among the cutting boards 103 and the dam boards 105; and the whole upper mould 1 is integrally formed. During the detailed production process, a length of the arc-shaped grooves 102 is in a range of 380-440 mm, and a width of the arc-shaped grooves 102 is in a range of 2-4 mm.

Figure 3A:
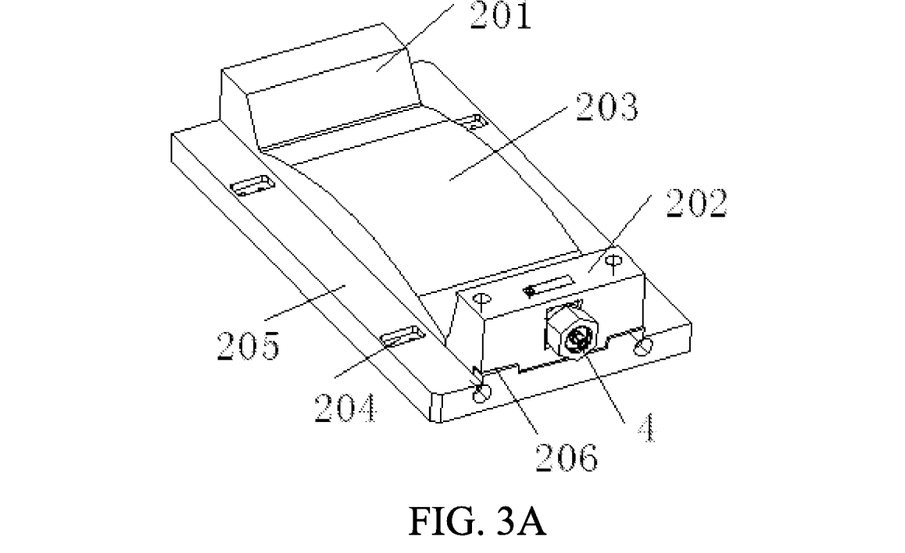
FIG. 3A is a perspective view of a lower mould according to the preferred embodiment of the present invention.
Figure 3B:
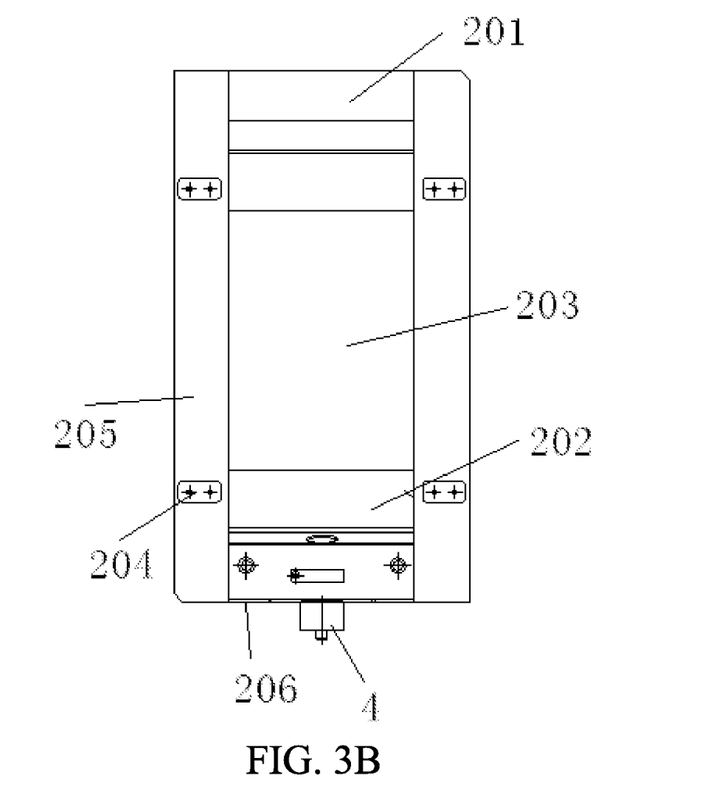
FIG. 3B is a main view of the lower mould according to the preferred embodiment of the present invention.
Figure 3C:
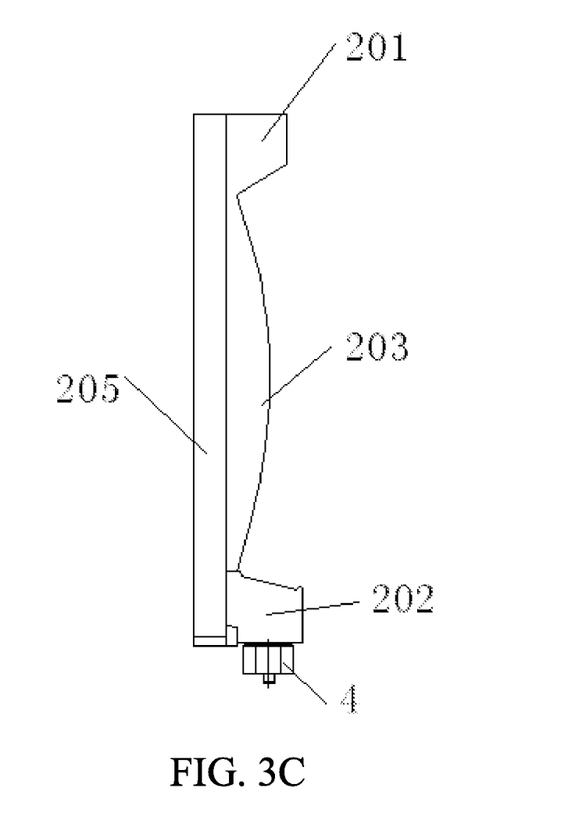
FIG. 3C is a left view of the lower mould according to the preferred embodiment of the present invention.
Figure 3D:
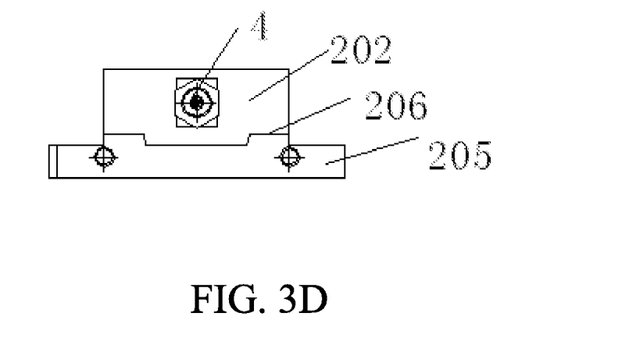
FIG. 3D is a bottom view of the lower mould according to the preferred embodiment of the present invention.
Figure 4A:
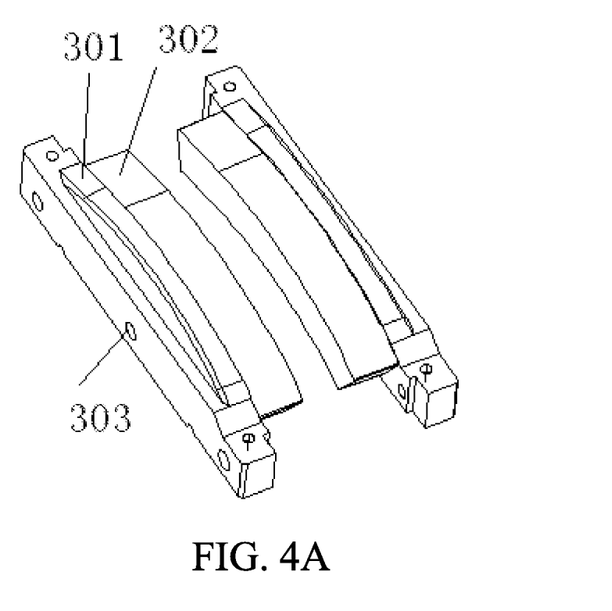
FIG. 4A is a perspective view of sliding blocks according to the preferred embodiment of the present invention.
Figure 4B:
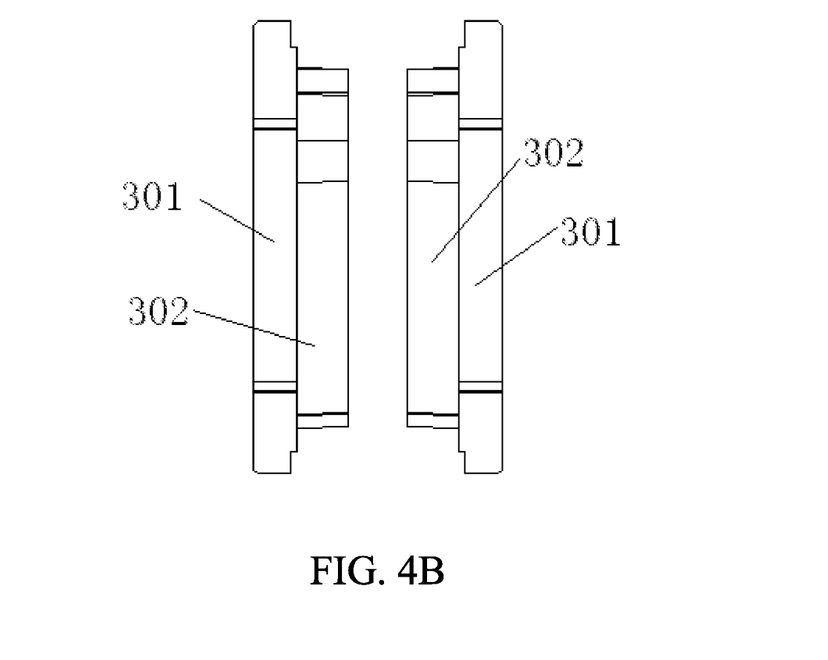
FIG. 4B is a main view of the sliding blocks according to the preferred embodiment of the present invention.
Figure 4C:
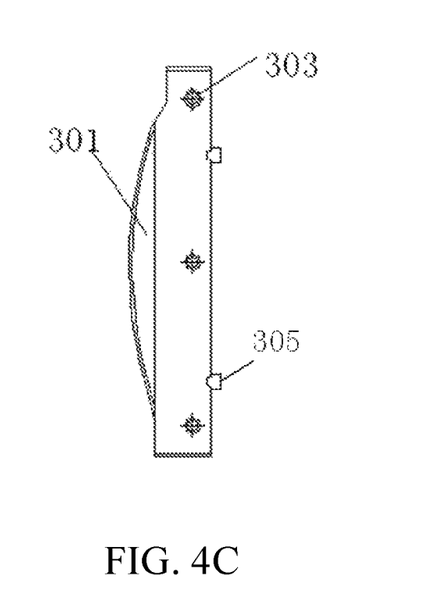
FIG. 4C is a left view of the sliding blocks according to the preferred embodiment of the present invention.
Figure 4D:
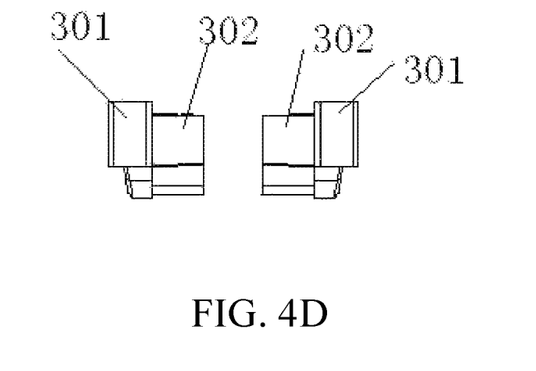
FIG. 4D is a bottom view of the sliding blocks according to the preferred embodiment of the present invention.

FIG. 3A is a perspective view of the lower mould, FIG. 3B is a main view of the lower mould. FIG. 3C is a left view of the lower mould. FIG. 3D is a bottom view of the lower mould. As shown in FIG. 3A-FIG. 3D, the lower mould 2 is for guaranteeing the basic shape and the appearance of a lower surface of the product (namely the flame-retardant bending beam). The lower mould 2 serves as the product placement basis, comprising a lower mould base 205, two steps 201 and 202 which are respectively arranged at an upper side and a lower side of the lower mould base, and a convex part 203 between the two steps, wherein: the air nozzle port 4 is opened at one of the two steps; grooves 204 corresponding to convex strips 305 of the sliding blocks 3 are opened on the lower mould 2; the whole lower mould 2 is integrally formed; an edge 206 is arranged at a joint between the step 202 where the air nozzle port 4 is opened and the lower mould base 205 (when the upper mould assembles with the lower mould, the edge 206 corresponds to the upper mould grooves 107). FIG. 4A is a perspective view of the sliding blocks. FIG. 4B is a main view of the sliding blocks. FIG. 4C is a left view of the sliding blocks. FIG. 4D is a bottom view of the sliding blocks. As shown in FIG. 4A-FIG. 4D, the sliding blocks 3 are for guaranteeing the basic shape and the appearance of two side surfaces of the product (namely the flame-retardant bending beam). Structures of the two sliding blocks 3 are completely symmetrical; each sliding block 3 comprises a convex surface 301 and a convex part 302; a screw hole 303 is opened at a side surface of each sliding block; and a screw passes through the screw hole 303 for fastening the sliding block 3 at the lower mould 2. Basic principles, main features and advantages of the present invention are showed and described as above. One skilled in the art should understand that: the present invention is not limited to the above preferred embodiment; the description in the preferred embodiment and the specification is merely for illustrating the principles of the present invention; various modifications and improvements of the present invention, made without departing from the spirit and range of the present invention, are all encompassed in the protection scope of the present invention. The protection scope of the present invention is determined by claims and equivalents thereof.

What is claimed is:

1. A method for molding a flame-retardant bending beam integrated with a three-dimensional (3D) nylon air duct, comprising steps of:
   (1), cutting a nylon air duct with a width of 300-500 mm into a prototype air duct corresponding to a shape and a size of an inner cavity of the bending beam; and forming the 3D nylon air duct with an air nozzle;
   (2), selecting a flame-retardant carbon fiber pre-impregnated material, wherein a material obtained through pre-impregnating epoxy flame-retardant resin and carbon fiber precursors is called the flame-retardant carbon fiber pre-impregnated material;
   (3), pasting the carbon fiber pre-impregnated material with a tailored size into a cavity of a mould, wherein the pre-impregnated material is compacted by a plastic scraper after pasting; placing the 3D nylon air duct in the middle of the cavity of the mould; pumping a safety pressure of 0.1 MPa to the 3D nylon air duct, and checking whether the air duct ventilates normally; and
   (4), curing and molding, comprising steps of: after closing the mould of a product in step (3), placing the mould on a hot press machine; and processing the product with thermal molding, with temperature and pressure parameters as follows:
   a molding time is 3600 s with a pressure kept at 1.2 MPa;
   a molding temperature is 145±5° C.;
   an external pressure of the hot press machine is 4 MPa;
   a pressurizing formula of the 3D nylon air duct is that: the pressure is slowly increased to 0.2 MPa during 0-50 s, then slowly increased to 0.6 MPa during 50-300 s, thereafter slowly increased to 1.0 MPa during 300-600 s, and finally slowly increased to 1.2 MPa during 600-3600 s;
   during thermal molding, pressurizing an interior of the product through the air nozzle, so that the bending beam is integrally formed and cured.

2. The method for molding the flame-retardant bending beam integrated with the 3D nylon air duct, as recited in claim 1, wherein: according to different shapes and sizes of the product, a thickness of a wall of the 3D nylon air duct is 20 μm, 40 μm or 60 μm.

3. The method for molding the flame-retardant bending beam integrated with the 3D nylon air duct, as recited in claim 1, wherein: the plastic scraper is made of at least one member selected from a group consisting of PVC (polyvinyl chloride), PET (polyethylene terephthalate), PTFE (polytetrafluoroethylene) and rubber.

* * * * *